United States Patent [19]

Beghini

[11] Patent Number: 5,165,361
[45] Date of Patent: Nov. 24, 1992

[54] METHOD FOR TREATING AND PRESERVING BIVALVE MOLLUSCS IN THE LIVE STATE AND A PACKING FOR CARRYING OUT SAID METHOD

[75] Inventor: Gino Beghini, Grandcamp Maisy, France

[73] Assignee: Aqua Biotique Containers, Ablon, France

[21] Appl. No.: 742,239

[22] Filed: Aug. 8, 1991

[30] Foreign Application Priority Data

Aug. 8, 1990 [FR] France .................... 90 10136

[51] Int. Cl.⁵ .................................. A01K 61/00
[52] U.S. Cl. .......................................... 119/4
[58] Field of Search ............... 119/2, 3, 4; 220/366, 220/367, 913, DIG. 27, 89.1; 206/524.8

[56] References Cited

U.S. PATENT DOCUMENTS

| | | | |
|---|---|---|---|
| 884,140 | 4/1908 | Erlwein et al. | 119/3 X |
| 1,405,775 | 2/1922 | Friedrichs | 119/3 |
| 1,512,591 | 10/1924 | Friedrichs | 119/3 |
| 2,302,336 | 11/1942 | Macdonald | 119/4 |
| 2,316,607 | 4/1943 | Macdonald | 119/2 |
| 2,563,364 | 8/1951 | Proctor | 119/2 |
| 2,652,807 | 9/1953 | Washburn | 119/3 |
| 2,816,682 | 12/1957 | Brucker | 220/366 X |
| 4,442,951 | 4/1984 | Nakazawa et al. | 220/367 X |
| 4,627,336 | 12/1986 | Nam | 220/367 X |
| 4,965,955 | 10/1990 | Campbell et al. | 119/3 X |

FOREIGN PATENT DOCUMENTS

| | | |
|---|---|---|
| 368420 | 3/1930 | Belgium . |
| 1440851 | 4/1966 | France . |
| 2054812 | 2/1981 | United Kingdom ............. 119/4 |

Primary Examiner—Gene Mancene
Assistant Examiner—Thomas Price
Attorney, Agent, or Firm—Sughrue Mion Zinn Macpeak & Seas

[57] ABSTRACT

The method comprises partly filling an open container (4) with water (28) coming from the natural medium of the molluscs or the medium in which the molluscs were bred, putting at least one live bivalve mollusc in the water of the container in such manner that the container comprises a space (32) containing air, closing the container in a sealed manner, and replacing the air contained in the space with oxygen via a controlled valve (26) provided in a wall part of the packing.

16 Claims, 1 Drawing Sheet

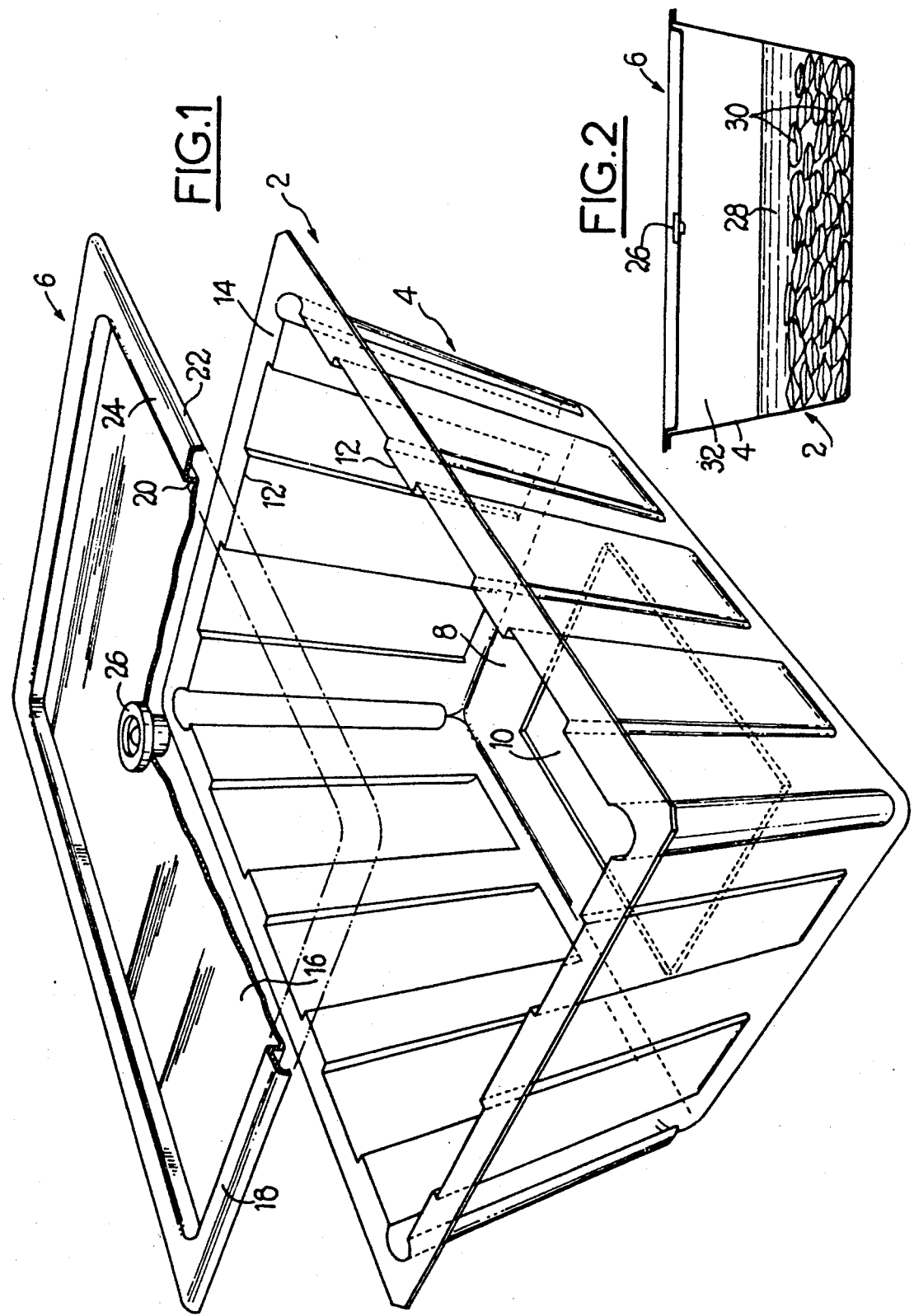

METHOD FOR TREATING AND PRESERVING BIVALVE MOLLUSCS IN THE LIVE STATE AND A PACKING FOR CARRYING OUT SAID METHOD

BACKGROUND OF THE INVENTION

The present invention relates to the treatment and preservation of live bivalve molluscs and in particular, oysters, clams or the like.

These molluscs have a shell defining a cavity in which is retained water constituting the element necessary to the life of the mollusc, the water being regularly renewed when the mollusc is located in its natural aquatic medium by the partial opening of the shell.

When the water is not renewed, the excrements in the shell pollute the water in particular by the fecal coliforms which render the water unfit for consumption.

Further, in the absence of a renewal of the water for a prolonged period of time the mollusc dies.

These phenomena present problems of the treatment of the fecal coliforms during transportation and preservation of such molluscs.

At the present time, molluscs such as oysters, are transported and stored in small cages for example, i.e. a light apertured packing assembled by clipping together, having a perpendicular horizontal section to allow these small cages to be stacked and having a rectangular or trapezoidal vertical section to allow the small cages to be fitted one inside the other when empty.

With such a preserving method for transportation, the molluscs for example the oysters can remain alive for about fifteen days. However, the water contained within the shells of the oysters upon packing is not renewable and this results in an increase in the coliforms contained within the oyster, i.e. a pollution which in the end is liable to render them dangerous for consumption.

SUMMARY OF THE INVENTION

In order to overcome this drawback, an object of the invention is to provide a method for treating and preserving live bivalve molluscs which permits an easier commercialization while guaranteeing that they present no danger to the consumer and increasing their duration of life outside their natural medium or the medium in which they were bred.

The invention therefore provides a method for treating and preserving live bivalve molluscs in a closed packing, characterized in that it comprises the following steps:

A) partly filling an open packing of an adapted size with water, in particular water coming from the natural medium of the molluscs or the medium of the breeding of the molluscs, the water being eventually sterilized by means of ozone or ultraviolets, the level of the water being such that the packing comprises in its upper part a space containing air;

B) putting at least one live bivalve mollusc in the water contained in the packing;

C) closing the packing in a watertight and gastight manner;

D) extracting the air contained in the closed packing;

E) introducing into the closed packing a gas of controlled composition.

With such a method, there is found in the course of storage a large reduction in the internal pollution of the molluscs, the method in fact permitting effecting a bactericidal treatment of the water.

According to other features of the invention:

the gas is oxygen;

the gas is ozone;

the air is replaced by a gas of controlled composition through a controlled bidirectional valve provided in a wall part of the packing and normally biased toward its closed position;

the method further comprises optionally storing the closed packings in a refrigerated medium;

the method comprises one or more steps for renewing the gas contained in the upper space;

a food for nourishing the mollusc is also introduced into the open packing in the course of step A.

The invention also provides a packing (package) for carrying out the method of the invention.

The invention will be described in more detail hereinafter with reference to the accompanying drawing which is given solely by way of example and in which:

BRIEF DESCRIPTION OF THE DRAWING

FIG. 1 is an exploded perspective view, with a part cut away, of a packing for carrying out the method according to the invention;

FIG. 2 is a diagrammatic sectional view of a packing closed after carrying out the method according to the invention.

DESCRIPTION OF PREFERRED EMBODIMENTS

For carrying out the method according to the invention a packing 2 is used such as that shown in FIGS. 1 and 2.

In FIG. 1, the packing 2 comprises a part constituting an open container 4 and a cover 6.

The container 4 and the cover 6 are made from a transparent plastics material which must be watertight and gastight.

Note that the container and the cover may be made from any other material provided it is watertight and gastight and that the cover is placed in position on the container in such manner as to ensure that the closure is watertight and airtight.

The container 4 has a rectangular bottom 8 whose outer side is provided with a rectangular recess 10. The sides of the container 4 include ribs 12 for increasing the rigidity of these sides.

The open upper side of the container 4 includes a horizontal rim 14 which outwardly extends from the container 4.

The cover 6 comprises a planar rectangular part 16 adapted to close the open upper side of the container 4.

The edge portions of the part 16 define an outwardly extending rim 18 adapted to overlap the rim 14 of the container 4.

For this purpose, the rim 18 has an inverted U-section shape having a first flange 20 adapted to come into contact with the sides of the container 4 and a second flange 22 adapted to come into contact with the outer edge of the rim 14 of the container 4.

The bottom 24 of the U is adapted to come into contact with the horizontal portion of the rim 14.

The planar part 16 of the cover 6 includes a controlled bidirectional valve 26. The valve 26 is arranged in a zone of the part 16 which is in vertical alignment with the recess 10 of the container when the cover 6 is fitted onto the container 4.

This arrangement permits superimposing two packings, the part of the valve 26 outwardly projecting from the cover then being located in the recess 10 of the container located thereabove.

In order to carry out the preserving method according to the invention with the aid of a container of the type described hereinbefore, the container 4 is partly filled with water 28 (see FIG. 2) and then one or more molluscs 30 are introduced in such manner that the container 4 has in its upper part a space 32 containing air.

At least one product constituting food for nourishing the live molluscs may be added to the water of the container.

The cover 6 is then positioned in the opening of the container 4 and the rim 18 of the cover is thermowelded to the rim 14 of the container 4 so as to obtain a closed container which is watertight and airtight.

By means of the valve 26, the air contained in the space 32 is extracted and then a gas of controlled composition such as oxygen is introduced.

The gas of controlled composition may be a mixture of at least two gases, one of which will serve to oxygenate the water, the oxygen constituting a bactericide.

Within the framework of tests carried out with oxygen, packings 2 such as packings of the type described hereinbefore containing 3 kilos of oysters and 1.850 kilos of seawater were stored in a cold storage room at 5° C.

Note that in these tests the oxygen contained in the packing was not renewed, whereas, with the packing employed, it is possible by means of the valve 26 to extract the gas contained in the packing and then introduce therein "fresh" oxygen.

Upon packing, it was found that the total coliforms contained in the oysters were 1,440.

Measurements carried out during the preservation provided the following results:
after 7 days: presence of 250 total coliforms
after 14 days: presence of 55 total coliforms
after 21 days: presence of 84 total coliforms
after 28 days: presence of 55 total coliforms.

Thus it can be seen that, with the method according to the invention, the pollution of the molluscs is lower than that existing upon their packing.

After a period of about 14 days, there is observed a stabilization of the total coliforms in an amount distinctly less than the initial amount, which affords an improved guarantee of safety, in particular when they are consumed live.

These tests revealed that, after 28 days, the oysters were not only alive and may therefore be put on the market in the open air but were moreover less polluted than when they were packed.

In other words, the tests revealed that by treating live oysters with oxygen by means of the preservation method according to the invention, these oysters can be preserved for 4 weeks without impairing their quality and can be put on the market by preserving them in the open air according to present practice for about 15 days in a cool place.

Note that tests were also carried out with ozone with very satisfactory results.

What is claimed is:

1. Method for preserving and treating live bivalve molluscs submerged in water in a closed packing so that the molluscs and the water are safe for human consumption, said method comprising the following steps: without ever filtering the water,
   A) partly filling an open packing of suitable size with water, the level of said water being such that said packing includes in an upper part thereof a space containing air;
   B) putting at least one live bivalve mollusc in said water contained in said packing;
   C) closing said packing in a watertight and gastight manner;
   D) extracting air contained in said closed packing; and
   E) then, introducing into said space of said closed packing a gas of controlled composition.

2. Method according to claim 1, wherein said water comes from a natural medium of said molluscs.

3. Method according to claim 1, wherein said water comes from a medium in which said molluscs were bred.

4. Method according to claim 1, wherein said gas is oxygen.

5. The method according to claim 4, wherein the oxygen acts as a bactericide and significantly reduces the water coliform count from that existing after step B.

6. Method according to claim 1, wherein said packing is transparent, and wherein said gas is ozone.

7. The method according to claim 6, wherein the ozone acts as a bactericide and significantly reduces the water coliform count from that existing after step B.

8. Method according to claim 1, wherein said steps D) and E) are carried out through only a single controlled bidirectional valve which is provided in a wall part of said packing and is normally biased to a closed position of said valve.

9. Method according to claim 1, further comprising storing said closed packing in a refrigerated medium.

10. Method according to claim 1, further comprising at least one step for renewing said gas contained in said space.

11. Method according to claim 1, wherein a food for nourishing the molluscs is also introduced into said open packing in said step A).

12. A packing for carrying out a method for preserving and treating live bivalve molluscs in a closed packing, said method comprising the following steps:
   A) partly filling an open packing of suitable size with water, the level of said water being such that said packing includes in an upper part thereof a space containing air;
   B) putting at least one live bivalve mollusc in said water contained in said packing;
   C) closing said packing in a watertight and gastight manner;
   D) extracting air contained in said closed packing;
   E) introducing into said closed packing a gas of controlled composition;
   said packing comprising a first part constituting an open hollow body, a second part constituting a cover thermoweldable to said hollow body, and a controlled bidirectional valve placed in said cover for communicating with the interior of said packing.

13. The packing according to claim 12, wherein said packing is transparent, and wherein said gas is ozone.

14. The packing according to claim 12, wherein said bidirectional valve is only a single bidirectional valve that is normally biased to a closed position, and wherein said packing is in the form of a transportable container.

15. The packing according to claim 14, wherein a bottom surface of said first part contains a recess for receiving a bidirectional valve of another said packing on which said first part is superposed.

16. The method according to claim 1, wherein said steps are performed without any replacement of the water.

* * * * *